United States Patent [19]

Ajero

[11] 3,756,701
[45] Sept. 4, 1973

[54] VIEWING DEVICE FOR PRODUCING ILLUSION OF MOTION

[76] Inventor: Fortunato S. Ajero, 521 Rawson Ct., South Milwaukee, Wis. 53172

[22] Filed: Oct. 15, 1971

[21] Appl. No.: 189,712

[52] U.S. Cl. ............... 350/288, 272/8 M, 272/13, 350/293
[51] Int. Cl. ............................................. G02b 5/08
[58] Field of Search ............... 350/293, 288, 289, 350/7, 238, 239; 272/13, 8 M, 8 R, 80; 40/130 X

[56] References Cited
UNITED STATES PATENTS

| | | | |
|---|---|---|---|
| 2,619,870 | 12/1952 | Torricelli | 350/239 |
| 2,417,704 | 3/1947 | Rylsky | 350/7 |
| 2,501,446 | 3/1950 | Justice | 350/238 |
| 3,317,206 | 5/1967 | Holt | 272/8 M |
| 2,961,926 | 11/1960 | Hoffmeister | 350/293 |
| 2,724,995 | 11/1955 | Matner | 350/7 |

*Primary Examiner*—David Schonberg
*Assistant Examiner*—Michael J. Tokar
*Attorney*—Allan B. Wheeler et al.

[57] ABSTRACT

Illusion of motion is made by relative movement between the image of an object or picture viewed in camera in a collapsible chamber, and distortions of such image produced by a distorted mirror which is rotatable in the chamber between the eye of the observer and the object or picture which is reflected in the mirror.

5 Claims, 6 Drawing Figures

PATENTED SEP 4 1973 3,756,701
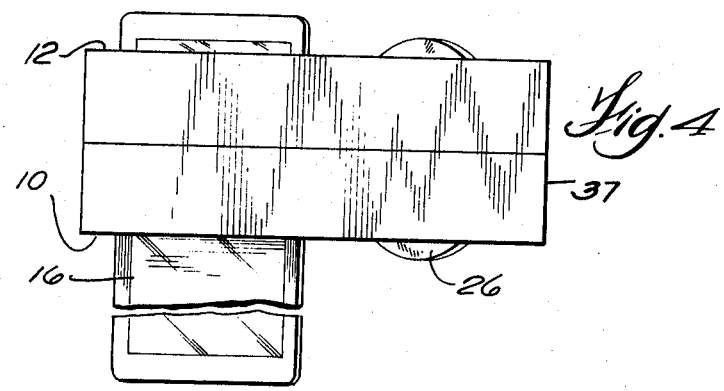
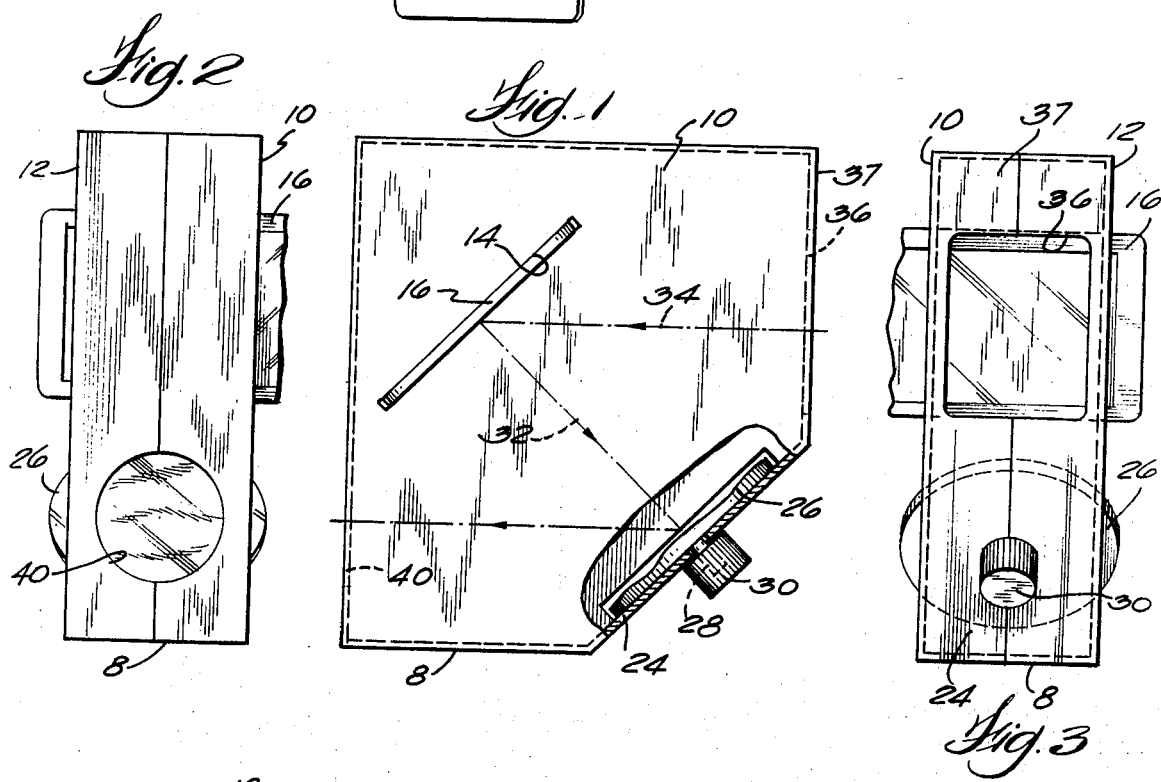
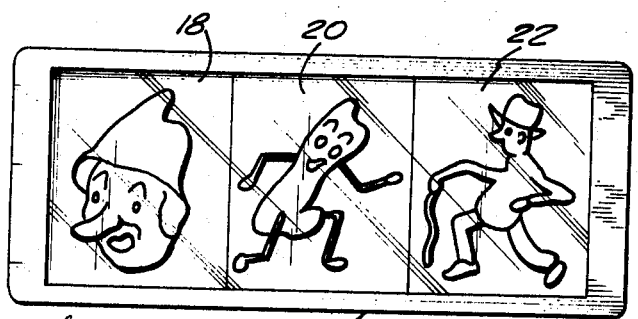
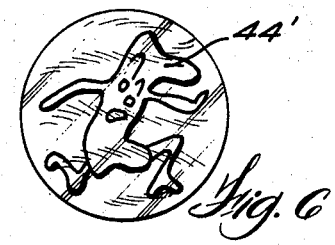
Inventor
Fortunato S. Ajero
By Wheler, House & Wheler
Attorneys

VIEWING DEVICE FOR PRODUCING ILLUSION OF MOTION

BACKGROUND OF INVENTION

Mirrors for effecting distortion are well-known but the instant device has been greatly simplified as compared with conventional apparatus for the purpose and it is so organized that the elements of the invention can be bound into a book and removed therefrom and assembled to make the device.

SUMMARY OF INVENTION

A collapsible viewing chamber adapted for assembly in situ in behalf of the user is designed to support for movement the image of an object or series of objects to be viewed.

The chamber has a viewing opening and an illumination opening on axes which are angularly related to each other and to a slide for objects to be viewed, the line of sight between the axes of said openings including a rotatably mounted distorted mirror.

BRIEF DESCRIPTION OF DRAWINGS

FIG. 1 is a view in side elevation of a viewing chamber for use in connection with the invention, a portion of its side wall being broken away.

FIG. 2 is a front elevational view of the chamber shown in FIG. 1.

FIG. 3 is a rear elevational view of the chamber of FIG. 1.

FIG. 4 is a plan view of the apparatus shown in FIG. 1.

FIG. 5 is a view of a carrier or slide having pictures as to which the illusion of motion is to be created.

FIG. 6 is a view of one of these pictures as it appears when distorted in the apparatus.

DETAILED DESCRIPTION

The chamber 8 is a composite device assembled for use from sheets which may, if desired, comprise sheets of paper or paper-like materials bound in a book for children. The assembled device has side walls 10 and 12 with opposed diagonal slots 14 to receive and guide slides or carriers such as that shown at 16 in FIG. 5 and which may be made to contain pictures such as those shown at 18, 20 and 22.

Directly opposite the plane of the opposed slots 14 on which the slide or carrier 16 may be introduced to the chamber 8, there is an oblique bearing wall 24 upon which there is rotatably mounted an image-distorting mirror 26 carried on a shaft or spindle 28 which may be manually rotated by a handle 30. The axis of the shaft is at right angles to the general plane of the slide 16 and is on a line of sight designated at 32 and which is at approximately 45° to the line 34 upon which illumination for the pictures enters the case 8 through the light opening 36 in rear wall 37. The general plane of mirror 26 is also at approximately 45° to the extended line of sight 38 leading from the mirror through the viewing opening 40 in front wall 41.

With the housing 10 manually supported, it is so manipulated that the light-receiving opening 36 is directed toward a window or other source of illumination. With the user peering through the viewing opening 40 toward the mirror 26, he sees one of the pictures 18, 20 or 22 on slide 16, and such picture is fixed in the chamber between the slots 14 to receive light from source 36 and to reflect it to the mirror for further reflection from the mirror through the viewing opening 40. If the user now rotates the knob 30 to cause the mirror to turn in its own plane within the housing 8, the distortion varies as different portions of the mirror receive and reflect different portions of the image of the workpiece 18, 20 or 22. If this occurs, illusion of motion is created. Thus a comparison of FIGS. 5 and 6 will show that the image 44 on the workpiece 20 has changed in attitude in the manner indicated at 44' in FIG. 6. Further illusions of motion may be created by simultaneous manipulation of the slide or card carrier 16 and mirror 26. After the user feels that he has exhausted the possibilities with regard to carrier 16, he substitutes a different carrier having different pictures.

I claim:

1. A viewing device for producing illusions of motion, such device comprising a chamber having opposite light-receiving and viewing openings and having a picture support set at an oblique angle between said openings, a distortion-producing mirror disposed within said chamber and opposed to said support, means mounting said mirror for movement in said chamber, and means for manually effecting such movement of the mirror during observation through said inspection opening of the reflection in said mirror of a picture on said support.

2. A device according to claim 1 in which the means mounting the mirror for movement is rotatable and the means for effecting such movement is manual.

3. A device according to claim 2 in which said chamber is collapsible and comprises paper-like wall portions adapted for assembly in situ in behalf of the user.

4. A device according to claim 3 in which said support comprises corresponding slots in opposing side walls of said chamber, which slots provide guide surfaces for a slide constituting a carrier for pictures to be viewed in distorted fashion to create the illusion of motion.

5. A device according to claim 1 in which the chamber has front, rear, top, bottom and side walls, and a beveled wall joining the rear and bottom walls at an angle, a spindle rotatably mounted in said beveled wall and provided externally of the chamber with a knob, a distorting mirror mounted on said spindle, said side walls being provided with opposing slots in a plane to which the mirror is approximately parallel, and a work carrier to be mounted in said slots in front of said mirror, the front and rear walls having light transmission openings, of which that in the front wall receives light for illuminating such work and that opening in the rear wall is an opening for viewing on said mirror the reflection of said work.

* * * * *